April 26, 1938.   H. PENNINGTON   2,115,279
ROTARY
Filed Oct. 27, 1931   2 Sheets-Sheet 1
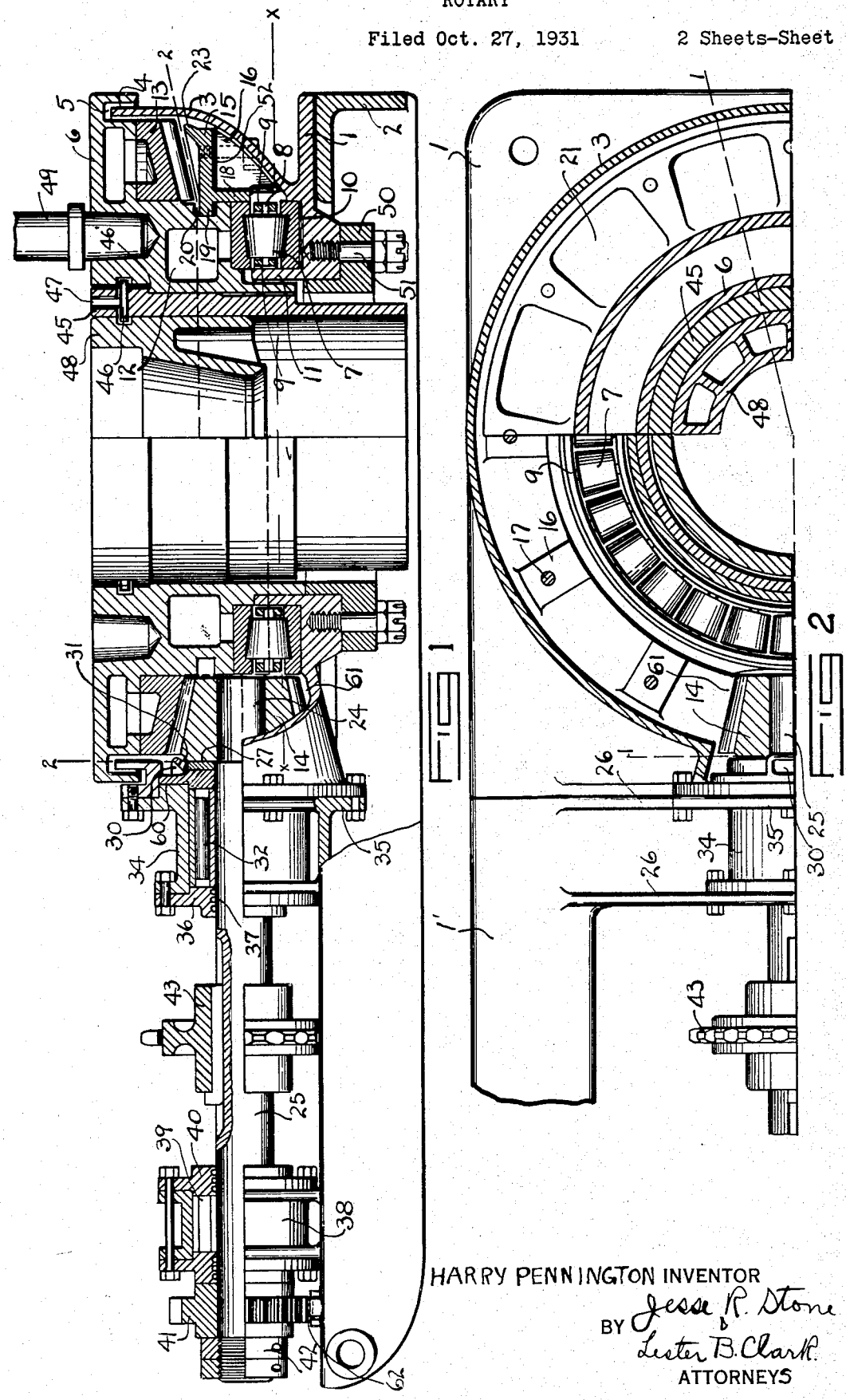
HARRY PENNINGTON INVENTOR
BY Jesse R. Stone
Lester B. Clark
ATTORNEYS April 26, 1938.　　H. PENNINGTON　　2,115,279
ROTARY
Filed Oct. 27, 1931　　2 Sheets-Sheet 2

HARRY PENNINGTON INVENTOR
BY Jesse R. Stone
Lester B. Clark
ATTORNEYS

Patented Apr. 26, 1938

2,115,279

UNITED STATES PATENT OFFICE 2,115,279

ROTARY

Harry Pennington, San Antonio, Tex.

Application October 27, 1931, Serial No. 571,362

15 Claims. (Cl. 255—23)

My invention relates to rotaries employed in rotating the drilling tool in deep well drilling by the rotary system. The improvement relates particularly to means for holding the rotary table in position upon the base or bed plate.

Rotaries as now constructed have ordinarily had no means of easily removing, and replacing the means for holding the table on the bed plate. Due to the upthrust of the beveled pinion upon the beveled table gear the table tends to be lifted in difficult drilling, thus misaligning the two gears unless such lifting is counteracted by a suitable hold-down device. It has been found that unless a hold-down device secures the table in exact concentric rotation and said device is thoroughly lubricated the table will tend to bind and by increased torque will set up a false indication of the nature of the earth formation through which the drill is progressing.

It is an object of my invention to provide an interior, segmental hold-down ring with means to cause a continuous circulation of oil over said hold-down means operating automatically while the table is rotated.

I also desire to provide a combined segmental hold-down ring and radial bearing for the table which will be capable of ready installation or removal and will position the table upon the bed plate for exact concentric rotation. I contemplate so lubricating this bearing that leakage of lubricant during the operation of the table will be avoided.

It is a further object of the invention to provide an integral shaft supporting member forming part of the bed plate for my table upon which the bearings for the drive shaft may be rigidly positioned so as to avoid any misalignment of the shaft bearings.

It is a further object of my invention to provide a lubricant chamber for the gears and a separate lubricant chamber for shaft bearings so that the proper quality of lubricant may be used in each chamber.

I also desire to provide a thrust bearing to receive the axial thrust of the pinion and shaft, and to run such thrust bearing constantly in a lubricant.

I also desire to provide a table hold down ring inside a chamber with the ring made in segments, whereby the segments may be inserted into a bearing recess in the table.

Also, I desire to provide a rigid, radial support for the hold-down ring whereby its segments cannot become misaligned.

A further object is to provide a means of projecting lubricant from between the meshing pinion and gear teeth, directly inward on to the table shoulder for flooding the same with lubricant where it contacts the segmental hold-down radial bearing ring; the oil being projected through the space that would be occupied by the omitted segment of hold-down ring.

I further desire to provide means in connection with the segmental hold-down ring whereby the adjustment of the table vertically, due to wear and the like, may be easily made.

It is a further object to provide effective means for lubricating the thrust bearing which receives the thrust of the pinion, said means being automatically operated through the operation of the drive pinion.

I aim also to provide a rigid mounting on the bed plate for the segmental ring.

Other objects of the invention reside in the particular construction and arrangement of the parts which will be apparent from the description which follows:

In the drawings herewith, Fig. 1 is a side view partly in central vertical section illustrating a rotary embodying my invention.

Fig. 2 is a partial top plan view of my invention taken in section on the line 2—2 of Fig. 1.

Figure 3:
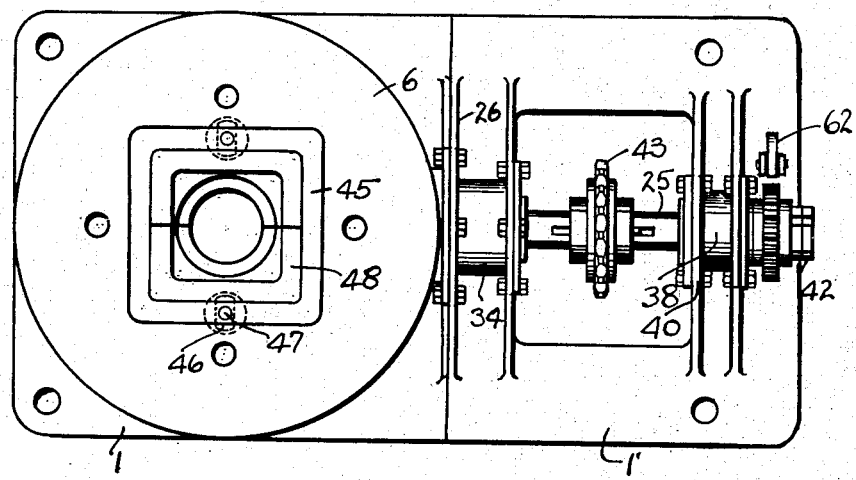
Fig. 3 is a top plan assembly view of my device.
Figure 4:
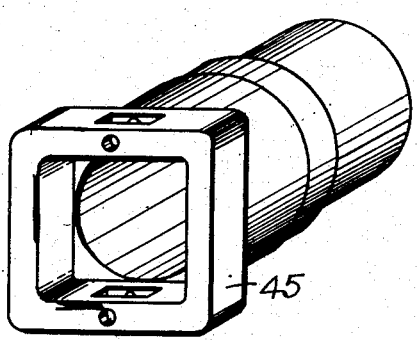
Fig. 4 is a perspective view illustrating the drive bushing employed with my rotary.

In constructing my improved rotary I employ a bed plate 1 which, as shown in Fig. 3, is of a general rectangular shape. Said bed plate is supported upon skids 2, or other similar supports, which may be bolted or otherwise secured to the bed plate or, if desired, may be made integral therewith. The bed plate is shown as divided along a transverse line into two parts for convenience of manufacture. Said plate is formed adjacent the rotary table with an upstanding rim 3, which, as seen in Fig. 1, is dished outwardly and has its upper extremity 4 received within a groove or channel 5 in the rotary table 6. The bed plate has an opening centrally of the rotary to receive the drill stem and the gripping means by which it is rotated.

The rotary table 6 is annular in shape and is adapted to fit over the upper portion of the rim 3 of the bed plate. It is supported upon the bed plate through means of a roller bearing said bearings being shown generally at 7. Said race is made up of upper and lower plates recessed to receive the frusto-conical-shaped bearings, said bearing being held in spaced relation by journals 8 held within rings 9. This is the ordinary bearing race. It is received in a groove 10 in the bed plate and an inner upstanding rim 11 on the bed plate supports the bearing race on its inner side. Above the bearings the table may be cored out as shown at 12 for purposes of lightening the structure.

On the under side of the table is a gear ring 13. This ring is beveled to engage with the drive pinion 14 by means of which the table is rotated. Said gear ring may be secured to the table by means of bolts or may be shrunk in place or secured by any desirable means.

The table is held in proper position upon the bed plate by means of a holddown ring shown at 15. Said ring is angular in cross-section and is made in two or more segments for convenience of installation. It is adapted to be supported upon the rim of said bed plate by means of lugs 16 secured on the rim and which are spaced apart, as shown at the left of Fig. 2. Bolts or studs 17 extending through the lugs and engaging within the ring hold the same securely in position. Said ring has a downwardly extending flange 18 at its inner side which bears against the upper plate of said race. Above the flange 18 the ring is extended laterally at 19 and engages within a recess 20 in the rotary table. This flange 19 thus acts to hold the table firmly in position, the lower flange 18 acting as a centering radial bearing.

The upper face of the holddown ring 15 is provided with spaced recesses 21 into which the oil carried around by the gear ring may be received. Said oil is held upon said ring by the outer upstanding rim 23 of said ring, it being obvious from Fig. 1 that lubricant received within said recesses will pass around the inner edge of said ring and lubricate the radial thrust bearing between the table and the ring and between the table and the roller bearing.

Figure 6:
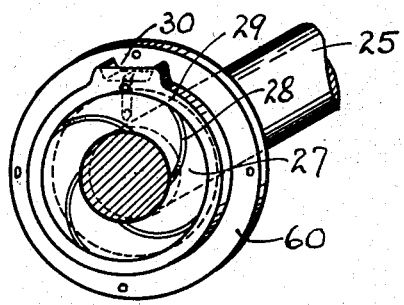
Fig. 6 is a broken perspective view illustrating pinion thrust plate which I employ.

The drive pinion 14 is mounted upon the reduced end 24 of the drive shaft 25. The bed plate has thereon upwardly curved webs 26, which are bored out to receive the bearings for the drive shaft. Adjacent the drive pinion on said shaft is a thrust plate 27 shown best in Fig. 6. This thrust plate has a series of spiral grooves 28 therein adjacent the pinion whereby the lubricant may be carried by the rotation of said pinion about the face of the bearing. Surrounding the thrust plate 27 is a flange or rim 29, the upper portion of which is extended to form a cup 30 to receive lubricant from the gear ring. It will be understood that oil or lubricant will collect in a well 61 in the bed plate below the pinion and will be carried by the rotation of the pinion into contact with the gear ring by means of which it will be splashed laterally from between the meshing gear teeth into the cup 30. From this cup it will be fed by an inclined groove 31 to the thrust plate 27 for the shaft.

The roller bearings 32 are housed within a casing 34, which has a radial flange 35 secured in fluid tight relation to the outer wall of the well 61. On the outer side of the bearing is a closure plate 36 secured tightly to the casing and making a tight fit at 37 with the shaft, thus preventing the loss of lubricant outwardly from the bearing. On the inner side of the bearing is a closure plate 60 on which the rim 29 is formed, said plate being secured tightly to the bearing housing 34, separating the housing from the well 61.

Adjacent the outer end of the shaft 25 is a second bearing housing 38 having roller bearings 39 therein. Said bearing housing is secured integrally to the bed plate and is closed at each end by closure plates 40. On the outer end of the shaft I may mount a ratchet shaped locking device 41, with pawls 62 secured in position upon the bed plate and engaging said ratchet for locking the shaft against rotation.

Between the bearing housings 34 and 38 a sprocket wheel 43 is keyed to the shaft and serves to communicate a rotation to the shaft from a source of power not shown.

I have shown my table as provided with break out post 49 which may be of any preferred construction. Within the central opening through the table I provide a table bushing 45, which is provided with a shoulder 46' adapted to seat upon a shoulder in the rotary table and be thus supported. It may be held in position in said table by means of a rotatable latch 46 having an operating stem 47 thereon.

Figure 5:
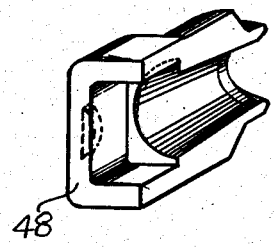
Fig. 5 is a perspective view showing one-half of the slip bushing or adapter employed with my invention.

Within the bushing is shown a slip receiving bushing 48. This is the usual slip bushing to receive slips by means of which the drill stem may be supported. It is to be understood that a drive bushing may be substituted therefor if desired. In Fig. 5 I have shown one-half of the slip bushing removed, it being understood that said bushing is longitudinally divided.

On the lower side of the bed plate and adjacent the opening therethrough is a guard ring 50 secured to said bed plate by means of studs 51.

In the operation of my rotary the segmental hold-down ring may be adjustable vertically for wear by means of shims 52, secured between the said ring and the supporting lugs 16. The table in rotating will carry lubricant picked up by the drive pinion 14 around the bed plate, allowing said lubricant to drip into the recessed upper face of the hold-down ring. From thence the lubricant will flow around the bearing surfaces between the hold-down ring and the table to the rotary bearings 7 the oil level in the base plate being maintained at the line X in Fig. 1. It will then be carried around to the side adjacent the well 61 into which it will flow to again be circulated. The segmental hold-down ring is thus effectively lubricated and the thrust surfaces on the inner side of the hold-down ring are also fed copiously with lubricant so as to prevent any tendency for binding during the rotation of the table. On the thrust plate bearings 27 for receiving the pinion thrust, there will be a continuous and automatic circulation of lubricant from the well 61 through the splashing of lubricant from the pinion gear into the cup 30 and from thence to the bearings. The inner parts 27 will also be effectively lubricated so that the principal bearing surfaces, both of the drive shaft and the rotary, will be constantly bathed in oil. The necessity for lubricating at frequent intervals will be therefore avoided and frictional wear upon the moving parts will be reduced to a minimum.

It is to be noted that the fitting of the rim 4 of the bed plate within the groove 5 in the rotary prevents the mud and other foreign material from finding access to the bearings of the rotary. On the inner side the table is extended downwardly past the bearings so that mud will flow downwardly away from the bearings. When it is seen that wear has occurred between the table and the bed plate, which allows play between the parts, one or more of the shims 52 may be removed, allowing the hold-down ring to be tightened in position in an obvious manner.

The further advantage in the construction which I have illustrated lies in the forming of the bearing housings 34 and 38 integral with the outer half bed plate, whereby they are held rigidly in position and cannot be moved out of alignment with each other. The maintaining of the shaft in alignment is therefore a simple matter thus avoiding a common difficulty in the operation of the rotary. The further advantage of my invention will be obvious to those skilled in the art.

There is no vertical adjustment of the outer one half 1' of the bed plate with its integral bearing housings 34 and 38, for there is a circular male and female fitting joint of the housing 34 with the rim 3. When assembled the shaft and bearings are permanently aligned on the outer half 1' of bed plate, and said outer half is also permanently aligned with the inner half 1 of bed plate.

What I claim as new is:

1. In an oil bath rotary for well drilling, a bed plate, a table rotatable thereon, means on said bed plate and table to form an enclosed chamber between the same, a table supporting bearing on said bed plate in said chamber, a gear ring on said table within said chamber, a hold-down ring attached to said bed plate to hold said table on said bed plate, said holddown ring having a series of depressions on the upper surface thereof to receive oil and conduct said oil radially inwardly for lubricating purposes.

2. In an oil bath rotary for well drilling, a bed plate divided transversely into two parts, a table rotatable on one of said parts, means on said table and bed plate forming a chamber between the same, a gear on said table, a shaft, a pinion thereon engaging said gear within said chamber, shaft bearings formed on the second of said bed plate parts, said shaft projecting through an opening in said chamber, means on one of said shaft bearing housings closing said opening in said chamber to contain lubricant, and means to close said housing about said shaft.

3. In a rotary for well drilling, a bed plate consisting of a plurality of parts, a table supported in rotatable position on one of said bed plate parts, a chamber formed between said table and bed plate, there being a lateral opening into said chamber, a shaft, a bearing housing therefor, a pinion on said shaft, the assembly of said shaft, bearing housing and pinion being mounted removable from said table, on another part of said bed plate from said table, an inner shaft bearing housing of said assembly fitting said bed plate with a fluid tight connection therebetween, said assembly being positioned by inserting said shaft into said lateral opening and securing said bed plate parts together.

4. In a rotary for well drilling, a bed plate, an upstanding annular rim thereon enclosing a chamber, a table rotatable above said rim and co-operating therewith to keep out slush, a gear on said table, said table having a lateral opening, means engaging said gear to drive said table, a series of supports on said bed plate rim within the same and a hold-down ring on said supports and supported against movement radially thereon, said ring being formed in segments adapted to be introduced through said opening.

5. In a rotary machine of the type employed in the drilling of oil wells, the combination of: a base; a table above said base, said table and base cooperating to provide an annular oil chamber; a main bearing supported by said base and disposed in said oil chamber, means for driving said rotary table, including a pinion, and a ring gear mounted on said rotary table within said chamber, said pinion being adapted to deliver oil to said ring gear; and means for directing the oil from said ring gear inwardly above the oil level of said chamber to said main bearings.

6. In a rotary machine of the type employed in the drilling of oil wells, the combination of: a base having an annular oil channel; a rotary table above said base and cooperating therewith to form a closed chamber in which said oil channel is located; a bearing in said chamber and located in said oil channel for rotatably supporting said table; a ring gear on said table within said chamber; means for supplying said ring gear with oil, said oil falling from said ring gear; and means for intercepting said oil falling from said ring gear and delivering same to said bearing.

7. In a rotary machine of the type employed in the drilling of oil wells, the combination of: a base having an annular oil channel; a rotary table above said base and cooperating therewith to form a closed chamber in which said oil channel is located; a bearing in said chamber disposed within said oil channel for rotatably supporting said table; a ring gear on said table within said chamber; means for supplying said ring gear with oil, said oil falling from said ring gear; and a pan in said chamber below said ring gear for intercepting said oil falling from said ring gear and delivering same to said bearing.

8. A rotary machine of the type employed in the drilling of oil wells, combination of: a base having an annular oil channel; a rotary table above said base and cooperating therewith to form a closed chamber in which said oil channel is located; a bearing in said chamber in said oil channel for rotatably supporting said table; a ring gear on said table within said chamber; means for supplying said ring gear with oil, said machine being constructed so that the oil falling from said ring gear will serve to lubricate said bearing, and hold-down means for said table.

9. In an oil bath rotary for well drilling, a table, a bed plate supporting said table, an upstanding rim integral with said bed plate, a downwardly extending annular projection on said table forming a chamber between said bed plate and said table, a gear on said table within said chamber, a bearing on said bedplate, a separate segmental hold down ring attached to said bed plate, and supported within the said chamber and arranged to hold said table on said bed plate, and a lubricating system contained within said chamber, said gear acting to deliver lubricant to said segmental ring.

10. In an oil bath rotary for well drilling, a bed plate, a rotary table thereon, means forming an enclosure between said bed plate and said table, a table supporting bearing within said enclosure, a hold down ring spaced above said bed plate on the inner wall of said enclosure, said table having an annular recess therein, a flange on said ring engaging within said recess to hold said table on said bed plate during rotation, said hold down ring being detachable and removable from said enclosure, a gear on said table, a drive pinion for said gear, a lubricating well beneath said drive pinion in said bed plate and recesses on said ring to receive oil from said gear and conduct the same to said bearings.

11. In an oil bath rotary for well drilling, a bed plate, a table rotatable thereon, an annular upstanding extension integral with said bed plate, an annular downward extension on said table forming an enclosure between said extensions on said table and bed plate, a table supporting bearing on said bed plate within said enclosure, a radial bearing ring engaging said table, within said enclosure, and spaced above said bed plate, said ring being supported in position by said upward extension on said bed plate, and means to rotate said table operating to circulate lubricant within said enclosure.

12. In a rotary for well drilling, a bed plate, a table thereon, means including an upwardly extending wall formed integrally on said bed plate and forming an enclosure between said bed plate and table, a table supporting bearing between said table and said bed plate, a ring gear on said table, hold down means mounted detachably on said wall in said enclosure to hold said table on said bed plate, said means consisting of a segmental removable ring positioned directly below said gear to receive oil from said gear and direct it to said bearings for oiling said bearing and said hold down device.

13. In a rotary drilling machine, a bed plate, a table rotatable on said bed plate, means forming an enclosure between said table and bed plate, a thrust bearing within said enclosure, a gear on said table, a pinion engaging said gear within said enclosure, means consisting of a segmental ring mounted on the inner wall of said enclosure to hold said table on said bed plate acting also as a radial thrust bearing, said gear acting to circulate lubricant onto said ring and an outer rim on said ring to deflect said lubricant upon said radial bearing.

14. In an oil bath rotary for well drilling, a bed plate, a table rotatable thereon, an annular upstanding extension on said bed plate, an annular downward extension on said table forming with said bed plate extension an enclosure between said table and bed plate, a table supporting bearing on said bed plate within said enclosure, a radial bearing ring on said bed plate inside said enclosure, means to hold said radial bearing ring in permanent alignment whereby said table is caused to rotate concentrically, and means in said enclosure for circulating lubricant to said radial bearing.

15. In a rotary drilling machine, a table, a bed plate therefor, a thrust bearing between said table and bed plate, a chamber between said table and bed plate, a gear in said chamber, a drive shaft, a pinion thereon engaging said gear, a thrust plate for receiving the thrust of said pinion, said plate being secured about said shaft and closing said chamber, said pinion acting to circulate lubricant around said table and to said thrust bearing.

HARRY PENNINGTON.